United States Patent
Markou et al.

(10) Patent No.: US 10,208,134 B2
(45) Date of Patent: *Feb. 19, 2019

(54) AQUEOUS PRIMARY DISPERSIONS, METHOD FOR PRODUCING SAME, AND USE THEREOF

(71) Applicants: BASF COATINGS GMBH, Munster (DE); HENKEL AG & CO. KGAA, Dusseldorf (DE)

(72) Inventors: Konstantinos Markou, Cologne (DE); Andreas Niegemeier, Dusseldorf (DE)

( * ) Notice: Subject to any disclaimer, the term of this patent is extended or adjusted under 35 U.S.C. 154(b) by 117 days.

This patent is subject to a terminal disclaimer.

(21) Appl. No.: 15/105,631

(22) PCT Filed: Dec. 20, 2013

(86) PCT No.: PCT/EP2013/077681
§ 371 (c)(1),
(2) Date: Jun. 17, 2016

(87) PCT Pub. No.: WO2015/090442
PCT Pub. Date: Jun. 25, 2015

(65) Prior Publication Data
US 2017/0002107 A1 Jan. 5, 2017

(51) Int. Cl.
| | |
|---|---|
| C08F 2/28 | (2006.01) |
| C08F 2/30 | (2006.01) |
| C09D 4/00 | (2006.01) |
| C08K 5/17 | (2006.01) |
| C09D 5/44 | (2006.01) |
| C25D 7/00 | (2006.01) |
| C25D 9/02 | (2006.01) |
| C09D 7/63 | (2018.01) |
| C09D 7/40 | (2018.01) |

(52) U.S. Cl.
CPC ............ C08F 2/28 (2013.01); C08F 2/30 (2013.01); C08K 5/17 (2013.01); C09D 4/00 (2013.01); C09D 5/4438 (2013.01); C09D 5/4476 (2013.01); C09D 5/4492 (2013.01); C09D 7/63 (2018.01); C09D 7/67 (2018.01); C09D 7/68 (2018.01); C25D 7/00 (2013.01); C25D 9/02 (2013.01)

(58) Field of Classification Search
CPC .... C08F 2/28; C08K 5/17; C09D 7/67; C09D 7/68
See application file for complete search history.

(56) References Cited

U.S. PATENT DOCUMENTS

| | | | |
|---|---|---|---|
| 4,857,567 A | 8/1989 | Laugal et al. | |
| 9,914,840 B2* | 3/2018 | Markou | C09D 17/004 |
| 2007/0298976 A1* | 12/2007 | Ballard | C09K 8/32 507/129 |
| 2011/0207638 A1* | 8/2011 | Singh | C10M 105/34 508/282 |
| 2014/0262791 A1* | 9/2014 | Sekharen | C25D 11/02 205/50 |
| 2016/0333197 A1* | 11/2016 | Herrmann | C09D 5/4492 |
| 2017/0002106 A1* | 1/2017 | Markou | C08F 2/28 |
| 2017/0002107 A1* | 1/2017 | Markou | C08F 2/28 |
| 2017/0002213 A1* | 1/2017 | Markou | C09D 17/004 |
| 2017/0002215 A1* | 1/2017 | Markou | C09D 5/4488 |

FOREIGN PATENT DOCUMENTS

| | | |
|---|---|---|
| CA | 1333438 | 8/1992 |
| CN | 1172812 A | 2/1998 |
| CN | 1214054 A | 4/1999 |
| CN | 102382504 A | 3/2012 |
| CN | 102633661 A | 8/2012 |
| CN | 102875394 A | 1/2013 |
| DE | 19547777 A1 | 6/1996 |
| DE | 19628142 A1 | 1/1998 |
| DE | 19628143 A1 | 1/1998 |
| DE | 19703869 A1 | 8/1998 |
| WO | 8200148 | 1/1982 |
| WO | 2004007443 A2 | 1/2004 |

OTHER PUBLICATIONS

Office Action dated May 26, 2017 in corresponding Chinese Patent Application No. 201380081759.0.
International Search Report, dated Sep. 4, 2014; Eight (8) Pages.

* cited by examiner

*Primary Examiner* — Michael A Salvitti
(74) *Attorney, Agent, or Firm* — Dickinson Wright PLLC

(57) ABSTRACT

The invention relates to aqueous, cationically stabilized primary dispersions comprising dispersed polymer particles having a Z-average particle diameter of 5 to 500 nm and which are obtainable by emulsion polymerization of at least one olefinically unsaturated monomer (A). The emulsion polymerization takes place in the presence of one or more emulsifiers (E) having the following general formula: $R^1—N(R^2)(R^3)$, where $R^1$ is a moiety with 15 to 40 carbon atoms which contains at least one aromatic group and at least one aliphatic group, and which contains at least one functional group selected from hydroxyl groups, thiol groups, and primary or secondary amino groups, and/or has at least one carbon-carbon multiple bond, and $R^2$ and $R^3$, independently of one another, are the same or different aliphatic moieties containing 1 to 14 carbon atoms. The invention further relates to a method for producing the primary dispersions, and to coating agents which include the primary dispersions, and to the use of the primary dispersions for producing electrodeposition coatings, and also to conductive substrates coated with the coating compositions.

23 Claims, No Drawings

AQUEOUS PRIMARY DISPERSIONS, METHOD FOR PRODUCING SAME, AND USE THEREOF

JOINT RESEARCH AGREEMENT

The subject matter disclosed in the present specification was made by or on behalf of the below listed parties to a Joint Research Agreement. The Joint Research Agreement was in effect on or before the date the present subject matter was made and the present subject matter was made as a result of activities undertaken within the scope of the Joint Research Agreement. The parties to the Joint Research Agreement are BASF COATINGS GMBH and HENKEL AG & CO. KGAA.

The present invention relates to aqueous cationically stabilized primary dispersions which contain polymer particles having an average particle diameter of 5 to 500 nm, preferably 25 to 500 nm, and particularly preferably 50 to 500 nm (so-called polymerized "mini-emulsions"). The present invention further relates to a method for producing the aqueous primary dispersions by mini-emulsion polymerization. The present invention further relates to the use of the aqueous primary dispersions for producing coating materials, in particular coating materials for automotive initial coating and the coating compositions themselves.

Mini-emulsions are dispersions composed of water, an oil phase, and one or more surface-active substances; the particles present in dispersed form have an average particle diameter of 5 to 500 nm, preferably 25 to 500 nm, and particularly preferably 50 to 500 nm. Mini-emulsions are considered to be metastable (see Emulsion Polymerization and Emulsion Polymers, P. A. Lovell and Mohamed S. El-Aasser, editors, John Wiley and Sons, Chichester, N.Y., Weinheim, 1997, pages 700ff; Mohamed S. El-Aasser, Advances in Emulsion Polymerization and Latex Technology, 30th Annual Short Course, Volume 3, Jun. 7-11, 1999, Emulsion Polymers Institute, Lehigh University, Bethlehem, Pa., US). The so-called mini-emulsions are widely used in technology, for example in cleansers, cosmetics, or body care products, as well as in coating compositions such as electrodeposition coatings.

The production of aqueous primary dispersions by mini-emulsion polymerization is known, for example, from International Patent applications WO 82/00148 and WO 98/02466 or German Patent applications DE 196 28 143 A1 and DE 196 28 142 A2. In these known methods, the monomers may be copolymerized in the presence of various low-molecular, oligomeric or polymeric hydrophobic substances or co-stabilizers (see DE 196 28 142 A2). In addition, hydrophobic organic auxiliary agents having little solubility in water, for example plasticizers, film forming aids such as coalescing agents, or other organic additives, may be incorporated into the monomer droplets of the mini-emulsion (see DE 196 28 143 A1). WO 82/00148 describes, for example, the use of emulsifiers for stabilizing the emulsions disclosed therein.

WO 82/00148 discloses in particular the production of cathodically depositable resin emulsions, including mini-emulsions, using cationically adjustable emulsifiers which accumulate on the surface of the particles and impart a positive charge to them, which stabilizes the emulsion at pH values below 10. The emulsifiers may bear reactive groups via which the emulsifiers may be incorporated into the polymeric resin system during the crosslinking reaction. Explicitly mentioned examples of emulsifiers are the acetic acid salts of fatty monoamines and diamines such as primary tallow and oleyl amines or the acetic acid salts of tallow and oleyl diamines. Tallow and oleyl amines contain hydrocarbon chains having at least one carbon-carbon double bond. Polymeric emulsifiers may also be used, such as an epoxy phenol adduct that has been reacted with diethanolamine and cationically adjusted with acetic acid. In some exemplary embodiments in WO 82/00148, Ethoduomeen™ T13, which is a tertiary amine containing an unsaturated alkyl moiety, is used as co-emulsifier. According to the manufacturer, AkzoNobel, this material is N',N',N-tris-(2-hydroxyethyl)-N-tallowyl-1,3-diaminopropane. According to the teaching of WO 82/00148, the cationically adjusted emulsifiers are the only cationic components of the resin system.

In a study by Grabs and Schmidt-Naake (Macromol. Symp. 2009, 275-276, pp. 133-141), mini-emulsions are produced from 2-aminoethyl methacrylate hydrochloride and styrene, butyl acrylate, and/or butyl methacrylate and polymerized in situ, resulting in resin particles which bear a positive surface charge due to the positive charge of the aminoethyl methacrylate monomer, and are thus stabilized in the dispersion. Saturated cetyltrimethylammonium bromide, which has a quaternary N atom and therefore bears a permanent positive charge, may be used as a cationic co-emulsifier in production of the dispersion. In both cases, the positive charge is compensated for by halide anions.

Although the known aqueous primary dispersions and coating materials based on primary dispersions of this type already have numerous advantageous properties, there is still a need for coating agents which have improved shear stability, in particular better pumpability. For the case that the coating compositions are electrodeposition coating compositions, in particular cathodic electrodeposition coating compositions, such electrodeposition coating compositions have better ultrafiltration capability and long-term stability. The electrodeposition coatings which are producible using primary dispersions of the prior art, as described in WO 82/00148, for example, have shortcomings in this regard. In addition to the functions mentioned above, it is the aim that coating compositions which are obtainable from the primary dispersions have improved film formation, and thus allow improved corrosion protection in the case of use as an electrodeposition coating. It would be particularly advantageous if the primary dispersions were suitable for facilitating the deposition of metal ions contained in the electrodeposition coating bath.

An object of the present invention is to provide aqueous primary dispersions which are usable in aqueous coating compositions and which impart improved shear stability, in particular improved pumpability and ultrafiltration capability, as well as long-term stability to same, and the aqueous coating agents produced therefrom having better film-forming properties than those known thus far, so that they may be more widely used than has been possible heretofore. In particular, it is the aim that the primary dispersions are obtainable using customary mini-emulsion techniques. A further object of the present invention is to provide coating compositions which contain the primary dispersions according to the invention and which may be used, for example, in the area of electrodeposition coating as a coating agent component, in order to improve the film formation of the electrodeposition coatings and achieve increased corrosion protection of metallic substrates. The aim is to maintain the advantages of the aqueous primary dispersions and the coating materials produced therefrom which are known thus far.

Furthermore, the object of the present invention is to provide a method for producing the primary dispersions according to the invention, which in a simple manner provides aqueous primary dispersions having an improved property profile, and which are provided with the improved properties mentioned above, and which in particular have excellent suitability in coating compositions, in particular in cathodically depositable electrodeposition coatings.

One of the objects of the present invention is achieved by providing an aqueous, cationically stabilized primary dispersion comprising
(1) dispersed polymer particles which
  i. have a Z-average particle diameter of 5 to 500 nm, preferably 25 to 500 nm, and particularly preferably 50 to 500 nm, and
  ii. are obtainable by emulsion polymerization of at least one olefinically unsaturated monomer (A), the emulsion polymerization taking place in the presence of one or more emulsifiers (E) having the following formula:

where
  $R^1$ is a moiety with 15 to 40 carbon atoms which contains at least one aromatic group and at least one aliphatic group, and which contains at least one functional group selected from hydroxyl groups, thiol groups, and primary or secondary amino groups, and/or has at least one carbon-carbon multiple bond, and
  $R^2$ and $R^3$, independently of one another, are the same or different aliphatic moieties containing 1 to 14 carbon atoms.

The term "primary dispersion" is understood in coating technology to mean polymer dispersions which are produced by emulsion polymerization, having a discrete dispersed phase and a distinct phase boundary between the dispersed phase (polymer) and the dispersion agent (water). Primary dispersions are generally thermodynamically unstable with regard to coagulation. For this reason they must be electrostatically or sterically stabilized, i.e., brought into a thermodynamically metastable state (see, for example: B. Müller, U. Poth, Lackformulierung and Lackrezeptur [Coating Formulation and Preparation], Vincentz Network, Hannover, 2nd Edition, 2005).

However, in conjunction with the primary dispersion according to the invention as well as the coating compositions, and in particular electrodeposition coating compositions, described in greater detail below, "aqueous" herein means that the volatile portion, i.e., the volatile portion of the primary dispersion or of the coating agent upon drying at a temperature of 180° C. for 30 min, is preferably composed of more than 50% by weight water, particularly preferably more than 70% by weight water, and very particularly preferably more than 90% by weight water.

The term "mini-emulsion" herein is understood to mean those primary dispersions whose primary dispersion particles have an intensity-based Z-average particle diameter of 5 to 500 nm, preferably 25 to 500 nm, and particularly preferably 50 to 500 nm. The primary dispersions of the present invention are thus so-called mini-emulsions. The "Z-average particle diameter" may be determined according to the principle of dynamic light scattering in accordance with ISO 13321 and ISO 22412. For example, a Zetasizer Nano S from Malvern may be used. The particle size determination is carried out at 25° C. on a primary dispersion according to the invention diluted with deionized water (0.1 to 0.5 mL primary dispersion to 100 mL deionized water). The measurement is conducted automatically, using a 1 to 2 mL sample volume in a disposable cuvette. The measurement is evaluated using standard software of the above-mentioned measuring device.

With regard to the prior art, it was surprising and not foreseeable by those skilled in the art that the objects underlying the present invention may be achieved by the primary dispersions according to the invention and the method, described below, for their production, as well as the coating compositions produced from the primary dispersions. In particular, it was surprising that the emulsifiers (E) to be used according to the invention do not interfere with the course of the (co)polymerization and also do not result in coagulation of the primary dispersions according to the invention, but, rather, are responsible in large part for the improved properties of the primary dispersions and the coating compositions produced therefrom. It was particularly surprising that the method according to the invention provides the primary dispersions according to the invention in a particularly simple manner without occurrence of the above-described problems known from the prior art. The method according to the invention, as described in greater detail below, may be varied to a surprisingly great extent, so that primary dispersions according to the invention may be produced in batch operations and used directly as thermally crosslinkable coating materials or for producing such coating materials.

According to the invention, the primary dispersions contain dispersed polymer particles. The size of the polymer particles results directly from the method according to the invention described below. In this regard, the Z-average particle diameter is 5 to 500 nm. It is preferably 50 to 400 nm, particularly preferably 50 to 350 nm, and very particularly preferably 80 to 300 nm.

The primary dispersions according to the invention preferably have a high solids content, for example greater than 20% by weight, preferably greater than 30% by weight. Solids contents of greater than 40% by weight to 45% by weight may even be achieved. The solids content is determined by drying 2.0±0.2 g of the primary dispersion for 30 minutes at 180° C. The remaining residue is weighed and set in a ratio for the weigh-in, from which the solids content results. The primary dispersions according to the invention usually have a low viscosity, even with a high solids content, which represents a further particular advantage of the primary dispersions according to the invention and the coating materials according to the invention produced therefrom.

Olefinically Unsaturated Monomer (A)

An essential starting compound for producing the primary dispersions according to the invention and for the method according to the invention is the at least one olefinically unsaturated monomer (A). Within this document and in particular in the discussion below, the term "(meth)acrylic" stands for "methacrylic" as well as "acrylic."

The following are examples of suitable olefinically unsaturated monomers (A):
a1) (meth)acrylic acid esters which are essentially free of acid groups, such as (meth)acrylic acid alkyl esters or (meth)acrylic acid cycloalkyl esters containing up to 20 carbon atoms in the alkyl or cycloalkyl moiety, in particular methyl, ethyl, propyl, n-butyl, sec-butyl, tert-butyl, hexyl, ethylhexyl, stearyl, and lauryl acrylate or methacrylate; cycloaliphatic (meth)acrylic acid esters, in particular cyclohexyl, isobornyl, dicyclopentadienyl, octahydro-4,7-methano-1H-indene methanol, or tert-butylcyclohexyl (meth)acrylate; (meth)acrylic acid oxaalkyl esters or oxacycloalkyl esters such as ethyltriglycol (meth)acrylate and methoxyoligoglycol (meth)acrylate having a number average molecular weight $M_n$ of preferably approximately 300 to 800 g/mol (determinable by gel permeation chromatography, using a polystyrene standard), or other ethoxylated and/or propoxylated (meth)acrylic acid derivatives that are free of hydroxyl groups. Higher-functional (meth)acrylic acid alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indene dimethanol, or 1,2-, 1,3-, or 1,4-cyclohexanediol di(meth)acrylates; trimethylolpropane di- or tri(meth)acrylate; or pentaerythrite di-, tri-, or tetra (meth)acrylate may also be contained in small quantities. Within the scope of the present invention, small quantities of higher-functional monomers are understood to mean such quantities that do not result in crosslinking or gelling of the copolymers (A);

a2) monomers which bear at least one hydroxyl group, one primary, secondary, tertiary, or quaternary amino group, or one alkoxymethylamino group or imino group per molecule and which are essentially free of acid groups, such as hydroxyalkyl esters of acrylic acid, methacrylic acid, or some other alpha,beta-olefinically unsaturated carboxylic acid, which are derived from an alkylene glycol that is esterified with the acid, or which are obtainable by reacting the alpha,beta-olefinically unsaturated carboxylic acid with an alkylene oxide, in particular hydroxyalkyl esters of acrylic acid, methacrylic acid, ethacrylic acid, crotonic acid, maleic acid, fumaric acid, or itaconic acid, in which the hydroxyalkyl group contains up to 20 carbon atoms, such as 2-hydroxyethyl, 2-hydroxypropyl, 3-hydroxypropyl, 3-hydroxybutyl, and 4-hydroxybutyl acrylate, methacrylate, ethacrylate, crotonate, maleinate, fumarate, or itaconate; or hydroxycycloalkyl esters such as 1,4-bis(hydroxymethyl) cyclohexane, octahydro-4,7-methano-1H-indene dimethanol, or methylpropanediol monoacrylate, monomethacrylate, monoethacrylate, monocrotonate, monomaleinate, monofumarate, or monoitaconate; or reaction products of cyclic esters, such as epsilon-caprolactonee; or olefinically unsaturated alcohols such as allyl alcohol, or polyols such as trimethylolpropane mono- or diallyl ether or pentaerythrite mono-, di-, or triallyl ether (with regard to these higher-functional monomers a2), the statements made for the higher-functional monomers a1) analogously apply); N,N-dimethylaminoethyl acrylate, N,N-diethylaminoethyl methacrylate, allylamine, or N-methyliminoethyl acrylate or N,N-di(methoxymethyl) aminoethyl acrylate and methacrylate, or N,N-di(butoxymethyl)aminopropyl acrylate and methacrylate; within the scope of the present invention, the emulsifiers (E) that are usable according to the invention are not included in the monomers a2), even though some emulsifiers (E) meet the formal definition of the monomers a2);

a3) monomers which bear at least one acid group per molecule which may be converted to the corresponding acid anion group, such as acrylic acid, methacrylic acid, ethacrylic acid, crotonic acid, maleic acid, fumaric acid, or itaconic acid; olefinically unsaturated sulfonic or phosphonic acids or the partial esters thereof; or maleic acid mono (meth)acryloyloxyethyl ester, succinic acid mono(meth) acryloyloxyethyl ester, or phthalic acid mono(meth) acryloyloxyethyl ester. Within the scope of the present invention, the monomers a3) are not used as the sole monomers (A), but instead are always used in combination with other monomers (A), and only in such low quantities that the monomers a3) do not polymerize outside the droplets of the mini-emulsion;

a4) vinyl esters of monocarboxylic acids, branched in the alpha-position, containing 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain branched as well as straight-chain acyclic and/or cycloaliphatic olefins. The reaction of such olefins with formic acid or with carbon monoxide and water results in a mixture of carboxylic acids in which the carboxyl groups are situated predominantly on a quaternary carbon atom. Examples of other olefinic starting materials are propylene trimer, propylene tetramer, and diisobutylene. However, the vinyl esters a4) may also be produced in a manner, known per se, from the acids, for example by reacting the acid with acetylene. Due to their ready availability, vinyl esters of saturated aliphatic monocarboxylic acids containing 9 to 11 carbon atoms and branched at the alpha-carbon atom are particularly preferred, especially Versatic® acids (see Römpp Lexikon, Lacke and Druckfarben [Paints and Printing Inks], Georg Thieme Verlag, Stuttgart, N.Y., 1998, Versatic® acids, pages 605 and 606);

a5) reaction products of acrylic acid and/or methacrylic acid with the glycidyl ester of a monocarboxylic acid branched in the alpha-position and containing 5 to 18 carbon atoms per molecule, in particular a Versatic® acid, or instead of the reaction product, an equivalent quantity of acrylic and/or methacrylic acid which, during or after the polymerization reaction, is then reacted with the glycidyl ester of a monocarboxylic acid branched in the alpha-position and containing 5 to 18 carbon atoms per molecule, in particular a Versatic® acid;

a6) cyclic and/or acyclic olefins such as ethylene, propylene, but-1-ene, pent-1-ene, hex-1-ene, cyclohexene, cyclopentene, norbornene, butadiene, isoprene, cylopentadiene, and/or dicyclopentadiene;

a7) (meth)acrylic acid amides such as (meth)acrylic acid amide, N-methyl, N,N-dimethyl, N-ethyl, N,N-diethyl, N-propyl, N,N-dipropyl, N-butyl, N,N-dibutyl, N-cyclohexyl, N,N-cyclohexylmethyl, and/or N-methylol, N,N-dimethylol, N-methoxymethyl, N,N-di(methoxymethyl), N-ethoxymethyl, and/or N,N-di(ethoxyethyl) (meth)acrylic acid amide;

a8) monomers containing epoxy groups, such as the glycidyl esters of acrylic acid, methacrylic acid, ethacrylic acid, crotonic acid, maleic acid, fumaric acid, and/or itaconic acid;

a9) vinyl aromatic hydrocarbons such as styrene, 1,1-diphenylethylene, alpha-alkylstyrenes, in particular alpha-methylstyrene, and/or vinyl toluene; vinylbenzoic acid (all isomers), N,N-diethylaminostyrene (all isomers), alpha-methylvinylbenzoic acid (all isomers), N,N-diethylamino-alpha-methylstyrene (all isomers), and/or p-vinylbenzenesulfonic acid;

a10) nitriles such as acrylonitrile and/or methacrylonitrile;

a11) vinyl compounds, in particular vinyl and/or vinylidene dihalides such as vinyl chloride, vinyl fluoride, vinylidene dichloride, or vinylidene difluoride; N-vinyl amides such as vinyl-N-methyl formamide, N-vinylcaprolactam, 1-vinylimidazole, or N-vinylpyrrolidone; vinyl ethers such as ethyl vinyl ether, n-propyl vinyl ether, isopropyl vinyl ether, n-butyl vinyl ether, isobutyl vinyl ether, and/or vinyl cyclohexyl ether; and/or vinyl esters such as vinyl acetate, vinyl propionate, vinyl butyrate, vinyl pivalate, and/or the vinyl ester of 2-methyl-2-ethylheptanoic acid;

a12) allyl compounds, in particular allyl ethers and esters such as allyl methyl, ethyl, propyl, or butyl ether, or allyl acetate, propionate, or butyrate;

a13) polysiloxane macromonomers having a number average molecular weight $M_n$ of 1000 to 40,000 and an average of 0.5 to 2.5 ethylenically unsaturated double bonds per molecule, in particular polysiloxane macromonomers having a number average molecular weight $M_n$ of 2000 to 20,000, particularly preferably 2500 to 10,000 and in particular 3000 to 7000, and an average of 0.5 to 2.5, preferably 0.5 to 1.5, ethylenically unsaturated double bonds per molecule, as described in DE 38 07 571 A1 on pages 5 to 7, in DE 3706095 A1 in columns 3 to 7, in EP 0358153 B1 on pages 3 to 6, in U.S. Pat. No. 4,754,014 A1 in columns 5 to 9, in DE 4421823 A1, or in International Patent application WO 92/22615 on page 12, line 18 to page 18, line 10; and/or a14) acryloxysilane-containing vinyl monomers, producible by reacting hydroxyfunctional silanes with epichlorohydrin, followed by reacting the reaction product with (meth)acrylic acid and/or hydroxyalkyl and/or hydroxycycloalkyl esters of (meth)acrylic acid.

Further examples of suitable monomers (A) are found in German Patent application DE 196 28 142 A1, page 2, line 50 to page 3, line 7.

Basically, any of the above-mentioned monomers a1) to a14), except for monomer a3), may be polymerized by themselves.

According to the invention, however, it is advantageous to use at least two monomers (A), since in this way the property profile of the resulting copolymers may be varied very widely in a particularly advantageous manner, and adapted in a very targeted manner to the particular intended use of the primary dispersions according to the invention.

The monomers (A) are preferably selected in such a way that (meth)acrylate copolymers result whose property profile is determined primarily by the (meth)acrylates described above. Vinyl aromatic hydrocarbons a9), in particular styrene, are then preferably used as comonomer (A).

The emulsifiers (E) of formula $R^1$—$N(R^2)(R^3)$ used according to the invention, where $R^1$ is an oxygen-containing moiety with 15 to 40 carbon atoms which contains at least one aromatic group and at least one aliphatic group, $R^2$, $R^3$, and $R^4$, independently of one another, are the same or different aliphatic moieties containing 1 to 14 carbon atoms, may also be incorporated into the polymer as polymerizable monomers in the copolymerization with the monomers (A) during the production of the primary dispersion, provided that the aliphatic group in the moiety $R^1$ has at least one alkenically or alkynically unsaturated carbon-carbon multiple bond.

If, for example, the emulsifier E1

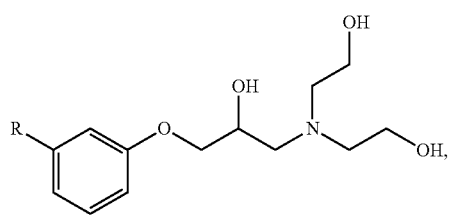

described and used as emulsifier (E) in the examples is used, it may be incorporated into the primary emulsion when R stands for $C_{15}H_{31-2n}$ and $n \neq 0$, i.e., n=1, 2, or 3. In such a case, the emulsifier (E) of general formula $R^1$—$N(R^2)(R^3)$ has 1, 2, or 3 carbon-carbon double bonds in the moiety $R^1$ which are available for copolymerization with the monomers (A).

Monomers from the above groups a1), a2), and a9) are preferably selected as monomers (A). Alkyl esters of (meth)acrylic acid, for example $C_1$-$C_4$ alkyl esters of (meth)acrylic acid and isobornyl (meth)acrylate, are very particularly preferably used from group a1). Hydroxyalkyl esters of (meth)acrylic acid, for example hydroxy-$C_2$-$C_4$ alkyl esters of (meth)acrylic acid, and/or aminoalkyl esters of (meth)acrylic acid, including in particular N,N-dialkylaminoalkyl esters of (meth)acrylic acid, very particularly preferably N,N-di-$C_1$-$C_4$ alkylamino-$C_2$-$C_4$ alkyl esters of (meth)acrylic acid, are very particularly preferably used from group a2). Aminoalkyl esters of (meth)acrylic acid, including in particular the N,N-dialkylaminoalkyl esters of (meth)acrylic acid, very particularly preferably N,N-di-$C_1$-$C_4$ alkylamino-$C_2$-$C_4$ alkyl esters of (meth)acrylic acid, are particularly preferably used when the emulsifier (E) has no polymerizable carbon-carbon double bonds, i.e., is not capable of copolymerization with the monomers (A), and/or when the primary emulsion contains no further cathodically depositable resins such as epoxy amine resins. However, the aminoalkyl esters of (meth)acrylic acid mentioned above may also be advantageously used in the presence of polymerizable emulsifiers (E) and/or other cathodically depositable resins. Vinyl aromatic hydrocarbons, such as styrene and/or 1,1-diphenylethylene in particular, may preferably be used as comonomers a9).

At least one monomer (A) is preferably used which contains reactive functional groups (a) that are able to undergo thermally initiated crosslinking reactions with groups (a) of the same type or with complementary reactive functional groups (b). These groups (a) or (a) and (b) may be present in the (co)polymers which result from the monomers (A), and which then have self-crosslinking properties. Accordingly, the primary dispersions according to the invention in question and the coating materials according to the invention produced therefrom are also self-crosslinking.

However, the complementary reactive functional groups (b) may also be present in the crosslinking agents (V) described below, which may be added to the primary dispersions according to the invention before, during, and/or after production thereof. The primary dispersions according to the invention in question and the coating materials according to the invention produced therefrom are externally crosslinking in this case.

With regard to the terms "self-crosslinking" and "externally crosslinking," additional reference is made to Römpp Lexikon, Lacke and Druckfarben, Georg Thieme Verlag, Stuttgart, N.Y., 1998, key word: "Curing," pages 274 to 276.

The selection of the particular complementary groups (a) or (a) and (b) depends on the one hand on whether they undergo no undesirable reactions during storage of primary dispersions according to the invention, and/or optionally do not interfere with or inhibit additional curing with actinic radiation, and on the other hand, in which temperature range the crosslinking is to take place.

Crosslinking temperatures from room temperature to 180° C. are preferably used in the coating materials according to the invention. For this reason, preferably used on the one hand are monomers (A) with thio, hydroxyl, methylol, methylol ether, N-methylol-N-alkoxymethylamino, imino, carbamate, allophanate, and/or carboxy groups, but in particular amino, alkoxymethylamino, or hydroxyl groups which occur in the monomers a2), in particular hydroxyl groups, and on the other hand, crosslinking agents with anhydride, carboxy, epoxy, blocked isocyanate, urethane, methylol, methylol ether, N-methylol-N-alkoxymethylamino, siloxane, amino, hydroxyl, and/or beta-hydroxyalkylamide groups, but in particular blocked isocyanate, urethane, or methylol ether groups. Methylol, methylol ether, and N-methylol-N-alkoxymethylamino groups are preferably used for producing self-crosslinking primary dispersions according to the invention.

When particularly reactive complementary groups (a) or (b) such as isocyanate groups are used, the components containing them, preferably the crosslinking agents, are not added until just before the primary dispersions according to the invention are used for producing the coating materials according to the invention in question. These coating materials according to the invention are also referred to as two- or multicomponent systems by professionals in the field.

When less reactive complementary groups (a) or (b) are used, the components containing them are preferably added to the primary dispersions according to the invention before production or during production, so that from the outset they are contained in the primary dispersions produced therefrom, and thus, also in the coating materials according to the invention. These coating materials according to the invention are also referred to as one-component systems by professionals in the field. Electrodeposition coatings, for example, are generally one-component systems of this type.

The (co)polymer formed from the monomers (A) and optionally the emulsifier (E) is not subject to any limitations with respect to the molecular weight distribution. However, the (co)polymerization is advantageously carried out in such a way that a molecular weight distribution $M_w/M_n$ of <12, particularly preferably <10, and in particular <7, results, as measured by gel permeation chromatography using polystyrene as standard.

Emulsifier (E)

The emulsifier (E) used for producing the primary dispersions according to the invention has the following general formula:

$$R^1-N(R^2)(R^3),$$

where $R^1$ is a moiety with 15 to 40 carbon atoms which contains at least one aromatic group and at least one aliphatic group, and which contains at least one functional group selected from hydroxyl groups, thiol groups, and primary or secondary amino groups, and/or has at least one carbon-carbon multiple bond, and $R^2$ and $R^3$, independently of one another, are the same or different aliphatic moieties containing 1 to 14 carbon atoms.

A carbon-carbon multiple bond is understood herein to mean a carbon-carbon double bond or a carbon-carbon triple bond. The carbon-carbon multiple bond is preferably a carbon-carbon double bond.

The moiety $R^1$ preferably contains an aromatic group $Gr_{arom}$ and two aliphatic groups $Gr_{ali1}$ and $Gr_{ali2}$ bound to $Gr_{arom}$. The moiety $R^1$ preferably has the structure $Gr_{ali1}$-$Gr_{arom}$-$Gr_{ali2}$-. 

The moiety $R^1$ preferably has at least one carbon-carbon multiple bond, particularly preferably at least one carbon-carbon double bond, in the at least one aliphatic group $Gr_{ali1}$. The presence of carbon-carbon multiple bonds, in particular carbon-carbon double bonds, has a positive effect on the shear stability of the dispersions and coating agents produced using the emulsifiers. In particular, undesirable migration of the emulsifiers in the dispersions and coating composition may be prevented or reduced. The moiety $R^1$ particularly preferably has one to three carbon-carbon double bonds in the at least one aliphatic group $Gr_{ali1}$.

The moiety $R^1$ very particularly preferably has at least one carbon-carbon multiple bond, in particular at least one carbon-carbon double bond, preferably one to three carbon-carbon double bonds, in the at least one aliphatic group $Gr_{ali1}$, and in a second aliphatic group $Gr_{ali2}$ that is different from the aliphatic group $Gr_{ali1}$ mentioned above, additionally contains at least one functional group selected from hydroxyl groups, thiol groups, and primary or secondary amino groups. Hydroxy groups, thiol groups, and primary or secondary amino groups determine the reactivity of the emulsifier with crosslinkers that are typical in coatings, for example blocked or nonblocked polyisocyanates, aminoplast resins such as melamine-formaldehyde resins, tris (alkoxycarbonylamino)triazines which are different from the above-mentioned crosslinkers, and also resins containing epoxy groups. Primary dispersions that contain such emulsifiers which bear hydroxyl groups, thiol groups, and/or primary or secondary amino groups may thus be chemically incorporated into the coating agent during the curing process of a coating agent that is produced using primary dispersions, as the result of which undesirable migration of the emulsifiers may be prevented or reduced.

The at least one aliphatic group $Gr_{ali1}$ in the moiety $R^1$, which has at least one carbon-carbon double bond, may be linear or branched, and is preferably linear. It may also be substituted or unsubstituted, and is preferably unsubstituted. In addition, this aliphatic group may contain heteroatoms selected from the group comprising O, S, and N, but is preferably free of heteroatoms. This aliphatic group in moiety $R^1$ is therefore particularly preferably linear, unsubstituted, and free of heteroatoms, and contains one to three double bonds. The group $Gr_{ali1}$ preferably contains 8 to 30, particularly preferably 10 to 22, and very particularly preferably 12 to 18 carbon atoms, for example 15 carbon atoms.

The at least one aliphatic group $Gr_{ali2}$ in the moiety $R^1$, which bears at least one functional group selected from hydroxyl groups, thiol groups, and primary or secondary amino groups, with OH groups being particularly preferred, and which is different from $Gr_{ali1}$, may be linear or branched, and is preferably linear. It may also be substituted or unsubstituted, and is preferably unsubstituted. In addition, this aliphatic group may contain heteroatoms selected from the group comprising O, S, and N, with O being preferred. The aliphatic group $Gr_{ali2}$ is preferably directly bound to the nitrogen atom which appears in the above general formula of the emulsifier (E). The at least one functional group selected from hydroxyl groups, thiol groups, and primary or secondary amino groups is preferably situated in the beta-position with respect to the nitrogen atom in the above general formula of the emulsifier (E). If one of the above-mentioned groups is in the beta-position with respect to the nitrogen atom in the general formula of the emulsifier (E), intramolecular hydrogen bridges to the tertiary nitrogen atom may be formed which reduce the catalytic properties of the tertiary nitrogen atom. As a result, the dispersion stability and storage stability of such primary dispersions according to the invention or coating compositions produced therefrom, which otherwise may typically undergo amine-catalyzed reactions, may be increased in this way. Another advantage of such emulsifiers, in which a hydroxyl group, thiol group, or a primary or secondary amino group is situated in the beta-position with respect to the nitrogen atom of the emulsifier of general formula (E), lies in the possibility of forming chelates with metal ions, which is advantageous when the primary dispersions according to the invention are used in a targeted manner in coating compositions from which metal ions are to be deposited. Metal ions which are present chelated in this way provide improved deposition, and may increase the corrosion protection effect of these types of coatings. A hydroxyl group is very particularly preferably in the beta-position with respect to this nitrogen atom. The group $Gr_{ali2}$ preferably contains 2 to 10, particularly preferably 2 to 8, and very particularly preferably 2 to 6 carbon atoms, for example 2 or 3 carbon atoms.

The aromatic group $Gr_{arom}$ in the moiety $R^1$ is preferably a phenylene or naphthylene group, preferably a phenylene group. The aromatic group $Gr_{arom}$ may be substituted or unsubstituted, and is preferably unsubstituted. The aromatic group $Gr_{arom}$ may contain heteroatoms selected from the group comprising O, S, and N, but is preferably free of heteroatoms. The group $Gr_{arom}$ preferably contains 6 to 15, particularly preferably 6 to 12, and very particularly preferably 6 to 10 carbon atoms, for example 6 carbon atoms.

A moiety ($R^1$—) of the following formula is very particularly preferred:

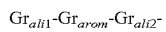

$Gr_{ali1}$-$Gr_{arom}$-$Gr_{ali2}$- where $Gr_{ali1}$ is linear, unsubstituted, and free of heteroatoms and has one to three, preferably one or two, double bonds, $Gr_{arom}$ is a phenylene or naphthylene group, and $Gr_{ali2}$ is linear, bears a hydroxyl group, preferably in the beta-position with respect to the nitrogen atom in the general formula of the emulsifier (E), and as a heteroatom additionally contains O in the form of an ether group, wherein in the case that $Gr_{arom}$ is a phenylene group, the groups $Gr_{ali1}$ and $Gr_{ali2}$ are bound to the phenylene group in the meta-position with respect to one another.

The moieties $R^2$ and $R^3$, independently of one another, stand for the same or different aliphatic moieties containing 1 to 14, preferably 2 to 10, particularly preferably 2 to 8, carbon atoms. If $R^1$ contains no functional group selected from hydroxyl groups, thiol groups, and primary or secondary amino groups, it is particularly advantageous when at least one of the moieties $R^2$ and $R^3$ bears such a functional group. At least two of the moieties $R^1$, $R^2$, and $R^3$, even more preferably all three moieties $R^1$, $R^2$, and $R^3$, very particularly preferably bear a functional group selected from hydroxyl groups, thiol groups, and primary or secondary amino groups. Of these, hydroxyl groups are very particularly preferred. The mentioned functional group in the moieties $R^2$ and $R^3$ is particularly preferably terminal, while it is non-terminal in the moiety $R^1$.

The moieties $R^2$ and $R^3$ may be linear or branched, and are preferably linear. $R^2$ and $R^3$ may have carbon-carbon multiple bonds, but are preferably saturated.

In addition to the hydroxyl, thiol, and primary and secondary amino groups mentioned above, the aliphatic moieties $R^2$ and/or $R^3$ preferably contain at least one, preferably exactly one, additional functional group selected from ether groups, ester groups, and amide groups. The ether oxygen, the —O— of the —O—C(=O) group, and the amide nitrogen of the amide group are preferably situated in the beta-position with respect to the nitrogen atom in the general formula of the emulsifier (E).

In one particularly preferred embodiment of the present invention, the emulsifier (E) is a cardanolaminopolyol as described in Chinese Patent applications CN 102633661 A and CN 102875394 A and which has the following formula:

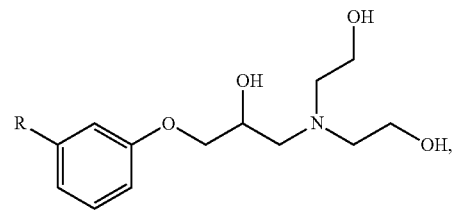

where R stands for $C_{15}H_{31-2n}$ and n may be 0 to 3, i.e., the moiety R may have 0 to 3 carbon-carbon double bonds. This compound is the neutral form of the emulsifier E1, as described in the Examples section of the present invention. It is obtainable, for example, by adding diethanolamine to a cardanol glycidyl ether of formula

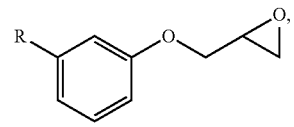

where R stands for $C_{15}H_{31-2n}$ and n=0 to 3, thereby opening the oxirane ring. Cardanol glycidyl ethers of this type are obtainable, for example, as Cardolite® NC 513 from Cardolite Europe N.V. (Ghent, Belgium).

Starting with cardanol glycidyl ether, for example a number of preferred emulsifiers according to the invention may be produced by adding an amine of general formula $HN(R^2)(R^3)$ to the oxirane ring. The moieties $R^2$ and $R^3$ herein have the meanings stated above.

The starting product for producing a cardanol glycidyl ether is the naturally occurring substance cardanol of formula

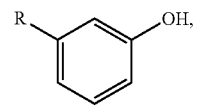

where R stands for $C_{15}H_{31-2n}$ and n=0 to 3. As is known from the chemistry of natural products, in particular the chemistry of naturally occurring fats and oils and the secondary products thereof, these substances are generally present as a mixture of individual compounds having different numbers of carbon-carbon double bonds. The natural product cardanol is such a mixture, in which the individual components differ by the number of double bonds in the chain R. The most common individual components contain 0 to 3 double bonds. Cardanol glycidyl ether is produced by reacting cardanol with epichlorohydrin, for example.

For all embodiments of the primary dispersions according to the invention, not only an emulsifier (E), but also a mixture of multiple emulsifiers (E) may be used. These preferably include those mixtures in which a portion of the emulsifiers in the moiety $R^1$ have carbon-carbon multiple bonds, and another portion of the emulsifiers in the moiety $R^1$ have no carbon-carbon multiple bonds. When emulsifier mixtures of multiple emulsifiers (E) are used, preferably more than 50 mol-%, particularly preferably more than 70 mol-%, of the moieties $R^1$ have carbon-carbon multiple bonds, with carbon-carbon double bonds being particularly preferred. For the cardanol derivatives mentioned above, this means that in the moiety R=$C_{15}H_{31-2n}$, n=1 to 3 preferably in more than 50 mol-%, particularly preferably more than 70 mol-%, of the moieties R, and n=0 in the remaining moieties R. However, emulsifier mixtures may also be used which are composed only of emulsifiers (E) for which n=1 to 3, or those for which n=0.

The emulsifier (E) is preferably used in the primary dispersion according to the invention in a quantity of 1 to 10% by weight, particularly preferably in a quantity of 2 to 8% by weight, and very particularly preferably in a quantity of 3 to 6% by weight, in each case based on the weight of one liter of the dispersion.

Crosslinking Agent (V)

Very particularly advantageous primary dispersions and coating materials according to the invention result when the monomers (A) and the at least one emulsifier (E) are (co)polymerized in the presence of at least one hydrophobic, i.e., essentially water-insoluble, crosslinking agent (also referred to herein as crosslinker). The essentially water-insoluble crosslinking agents preferably contain the above-described reactive functional groups (a) or (b), which undergo crosslinking reactions with the complementary reactive functional groups (a) or (b) that are present in the resulting (co)polymers and/or the emulsifier (E). The resulting primary dispersions according to the invention contain the crosslinking agents in a particularly good distribution, for which reason the crosslinking reactions proceed particularly well, so that less crosslinking agent may be used than in the corresponding dispersions that have been produced according to methods of the prior art. In addition, the resulting primary dispersions according to the invention may be used directly as coating materials according to the invention.

Examples of particularly well-suited hydrophobic, i.e., essentially water-insoluble, crosslinking agents are blocked polyisocyanates, tris(alkoxycarbonylamino)triazines, or completely etherified aminoplast resins, with blocked polyisocyanates being very particularly well suited.

Blocked Polyisocyanates

Examples of suitable organic polyisocyanates to be blocked are in particular the so-called coating polyisocyanates having aliphatically, cycloaliphatically, araliphatically, and/or aromatically bound isocyanate groups. Polyisocyanates having an average of 2 to 5, particularly preferably 2.5 to 5, isocyanate groups per molecule are preferably used.

Examples of particularly suitable polyisocyanates to be blocked are polyisocyanates having isocyanurate, biuret, allophanate, iminooxadiazindione, urethane, urea, and/or uretdione groups.

Polyisocyanates having urethane groups are obtained, for example, by reacting a portion of the isocyanate groups with polyols such as trimethylolpropane and glycerin. A triisocyanate essentially results when, for example, trimethylolpropane is reacted with 3 equivalents of a diisocyanate.

Preferably used for producing the polyisocyanates to be blocked are aliphatic or cycloaliphatic diisocyanates, in particular hexamethylene diisocyanate, isophorone diisocyanate, dicyclohexylmethane-2,4'-diisocyanate, dicyclohexylmethane-4,4'-diisocyanate, diphenylmethane-2,4'-diisocyanate, diphenylmethane-4,4'-diisocyanate, toluene-2,4-diisocyanate, and toluene-2,6-diisocyanate, diisocyanates derived from dimer fatty acids as marketed by Henkel under the trade name DDI 1410 and described in Patents WO 97/49745 and WO 97/49747, in particular 2-heptyl-3,4-bis(9-isocyanatononyl)-1-pentylcyclohexane; or 1,2-, 1,4-, or 1,3-bis(isocyanatomethyl)cyclohexane, 1,2-, 1,4-, or 1,3-bis(2-isocyanatoeth-1-yl)cyclohexane, 1,3-bis(3-isocyanatoprop-1-yl)cyclohexane, or 1,2-, 1,4-, or 1,3-bis(4-isocyanatobut-1-yl)cyclohexane, 1,8-diisocyanato-4-isocyanatomethyloctane, 1,7-diisocyanato-4-isocyanatomethylheptane, or 1-isocyanato-2-(3-isocyanatopropyl)cyclohexane, or mixtures thereof.

The diisocyanates as such may likewise be used for producing blocked diisocyanates. However, they are preferably used not alone, but in a mixture with the polyisocyanates, which have an average of more than two isocyanate groups.

Very particularly preferred are mixtures of polyisocyanates which have uretdione and/or isocyanurate groups and/or allophanate groups, and which are based on diphenylmethane-2,4'-diisocyanate, diphenylmethane-4,4'-diisocyanate, toluene-2,4-diisocyanate, and/or toluene-2,6-diisocyanate, as well as the addition products of the present diisocyanates with polyols, in particular triols such as trimethylolpropane and glycerin.

Examples of suitable blocking agents for producing the blocked di- or polyisocyanates are the blocking agents known from U.S. Pat. No. 4,444,954, such as the following, for example:

b1) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

b2) lactams such as epsilon-caprolactam, delta-valerolactam, gamma-butyrolactam, or beta-propiolactam;

b3) active methylenic compounds such as diethyl malonate, dimethyl malonate, the ethyl or methyl ester of acetic acid, or acetyl acetone;

b4) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, butyl diglycol, propylene glycol, diethylene glycol monomethyl ether, diethylene glycol monoethyl ether, propylene glycol monomethyl ether, methoxymethanol, glycolic acid, glycolic acid esters, lactic acid, lactic acid esters, methylol urea, methylol melamine, diacetone alcohol, ethylene chlorohydrin, ethylene bromohydrin, 1,3-dichloro-2-propanol, or acetocyanohydrin;

b5) mercaptans such as butyl mercaptan, hexyl mercaptan, t-butyl mercaptan, t-dodecyl mercaptan, 2-mercaptobenzothiazole, thiophenol, methylthiophenol, or ethylthiophenol;

b6) acid amides such as acetoanilide, acetoanisidine amide, acrylamide, methacrylamide, acetic acid amide, stearic acid amide, or benzamide;

b7) imides such as succinimide, phthalimide, or maleimide;

b8) amines such as diphenylamine, phenylnaphthylamine, xylidine, N-phenylxylidine, carbazole, aniline, naphthylamine, butylamine, dibutylamine, or butylphenylamine;

b9) imidazoles such as imidazole or 2-ethylimidazole;

b10) ureas such as urea, thiourea, ethylene urea, ethylene thiourea, or 1,3-diphenyl urea;

b11) carbamates such as N-phenylcarbamic acid phenyl ester or 2-oxazolidone;

b12) imines such as ethylene imine;

b13) oximes such as acetone oxime, formaldoxime, acetaldoxime, acetoxime, methyl ethyl ketoxime, diisobutyl ketoxime, diacetyl monoxime, benzophenone oxime, or chlorohexanone oxime;

b14) salts of sulfurous acid, such as sodium bisulfite or potassium bisulfite;

b15) hydroxamic acid esters such as benzyl methacrylohydroxamate (BMH) or allyl methacrylohydroxamate; or b16) substituted pyrazoles, in particular dimethylpyrazole or triazoles; and b17) mixtures of the above-mentioned blocking agents.

Etherified Aminoplast Resins

Examples of suitable completely etherified aminoplast resins are melamine resins, guanamine resins, or urea resins. Also suitable are the customary, known aminoplast resins whose methylol and/or methoxymethyl groups are partially defunctionalized by carbamate or allophanate groups. Crosslinking agents of this type are described in U.S. Pat. No. 4,710,542 A1 and EP 0 245 700 B1, and in the article by B. Singh et al., "Carbamylmethylated Melamines, Novel Crosslinkers for the Coatings Industry" in Advanced Organic Coatings Science and Technology Series, 1991, Volume 13, pages 193 to 207.

Tris(alkoxycarbonylamino)triazines

Suitable tris(alkoxycarbonylamino)triazines are described in U.S. Pat. No. 4,939,213 A1, U.S. Pat. No. 5,084,541 A1, or EP 0624577 A1, for example. In particular, tris (methoxy)-, tris(butoxy)-, and/or tris(2-ethylhexoxycarbonylamino)triazines may be used.

Of the crosslinking agents described above, the blocked polyisocyanates offer special advantages, and therefore are very particularly preferably used according to the invention.

The ratio of monomers (A) containing complementary reactive functional groups (a) or (b) to the crosslinking agents may vary over a very wide range. According to the invention, it is advantageous when the molar ratio of complementary reactive functional groups (a) or (b) in (A) to complementary reactive functional groups (a) or (b) in the crosslinking agents is 5:1 to 1:5, preferably 4:1 to 1:4, particularly preferably 3:1 to 1:3, and in particular 2:1 to 1:2. Particular advantages result when the molar ratio is approximately or exactly 1:1.

Further Components of the Primary Dispersions

The further components of the primary dispersions according to the invention may be divided, on the one hand, into those which are used for controlling and carrying out the method according to the invention for producing the primary dispersions according to the invention, for example initiators for the radical emulsion polymerization, or compounds that are able to regulate the molecular weight of the polymers, such as mercaptans, in particular dodecyl mercaptan; and on the other hand, those which optimize the property profile of the primary dispersions with regard to the subsequent area of application.

Initiators of the Radical Emulsion Polymerization

The monomers (A) to be used according to the invention and optionally, polymerizable emulsifiers (E), are usually reacted with one another in the presence of at least one water- and/or oil-soluble radical-forming initiator to form copolymers. The following are examples of usable initiators: dialkyl peroxides such as di-tert-butyl peroxide or dicumyl peroxide; hydroperoxides such as cumol hydroperoxide or tert-butyl hydroperoxide; peresters such as tert-butyl perbenzoate, tert-butyl perpivalate, tert-butylper-3,5,5-trimethyl hexanoate, or tert-butylper-2-ethyl hexanoate; peroxydicarbonates such as bis(4-tert-butylcyclohexyl) peroxydicarbonate; potassium, sodium, or ammonium peroxodisulfate; azo initiators, for example azodinitriles such as azobisisobutyronitrile; initiators such as benzopinacol silyl ether; or a combination of a non-oxidizing initiator with hydrogen peroxide.

Further examples of suitable initiators are described in German Patent application DE 196 28 142 A1, page 3, line 49 to page 4, line 6. Combinations of these initiators may also be used.

The proportion of the initiator in the reaction mixture is preferably 0.1 to 1.5% by weight, particularly preferably 0.2 to 1.0% by weight, and very particularly preferably 0.3 to 0.7% by weight, in each case based on the overall quantity of the monomers (A) and of the initiator.

Molecular Weight Regulators

Water-insoluble molecular weight regulators may preferably be used as molecular weight regulators. Mercaptans such as tert-dodecyl mercaptan are particularly suitable.

Further Components which Determine the Property Profile of the Primary Dispersions Water-insoluble, low-molecular oligomeric or polymeric substances, for example, may be used as further components of the primary dispersion. Examples of suitable hydrophobic compounds are oligomeric and/or polymeric polymerization, polycondensation, and/or polyaddition products. In particular, polymers which are coordinated with the subsequent use of the primary dispersion in a certain type of coating agent may be used. Thus, for example, epoxy amine adducts as commonly used in coating agents, in particular electrodeposition coatings, may be incorporated before or during the polymerization.

Method According to the Invention for Producing the Primary Dispersions According to the Invention A further subject matter of the present invention is a method for producing the primary dispersions according to the invention.

The production of the mini-emulsion within the scope of the method according to the invention has no special methodological features, and is carried out in a high shear field using the customary, known methods of dispersion or emulsification. Examples of suitable methods are described in Patents DE 196 28 142 A1, page 5, lines 1 to 30, DE 196 28 143 A1, page 7, lines 30 to 58, or EP 0 401 565 A1, lines 27 to 51.

Thus, a mixture of one or more monomers (A) with at least one emulsifier (E), optionally a molecular weight regulator and optionally at least one crosslinking agent (V), and optionally further components as described above, for example epoxy amine resins, cosolvents, etc., is preferably initially prepared. This mixture is optionally at least partially neutralized with an acid, preferably an organic carboxylic acid such as formic acid or lactic acid, and vigorously stirred until a coarse emulsion forms.

A preferably homogeneous, not yet polymerized miniemulsion is subsequently produced using a homogenizer, preferably a high-pressure homogenizer, with introduction of high shear forces, optionally under pressure.

The polymerization subsequently takes place in a suitable reactor. The customary, known stirred tank reactors, stirred tank reactor cascades, tube reactors, loop reactors, or Taylor reactors, as described, for example, in Patents DE 1071241 B1 or EP 0498583 A1 or in the article by K. Kataoka in Chemical Engineering Science, Volume 50, Issue 9, 1995, pages 1409 to 1416, are suitable as reactors for the (co) polymerization process. The radical copolymerization is preferably carried out in stirred tank reactors or Taylor reactors, the Taylor reactors being configured in such a way that the conditions of Taylor flow are met over the entire length of the reactor, even when the kinematic viscosity of the reaction medium greatly changes, in particular increases, due to the copolymerization.

According to the invention, the copolymerization is carried out in an aqueous medium. In addition to the emulsifiers, optional crosslinking agents, and optional hydrophobic compounds and optional protective colloids described in detail above, the aqueous medium may contain customary, known coating additives and/or other dissolved solid, liquid, or gaseous organic and/or inorganic, low- or high-molecular substances, provided that they do not adversely affect or even inhibit the (co)polymerization. Within the scope of the present invention, the term "small quantity" is understood to mean a quantity that does not eliminate the aqueous character of the aqueous medium.

However, the aqueous medium may also be pure water.

The (co)polymerization is advantageously carried out at temperatures above room temperature (25° C.), preferably with selection of a temperature range from 25 to 95° C., very particularly preferably 30 to 90° C. The (co)polymerization preferably takes place under a protective gas atmosphere, in particular a nitrogen atmosphere.

When particularly highly volatile monomers (A) are used, the (co)polymerization may also be carried out under pressure, preferably 1.5 to 3000 bar, particularly preferably 5 to 1500 bar, and in particular 10 to 1000 bar. In individual cases, temperatures even higher than 95° C. may be used.

The polymerization is generally activated and initiated by water-soluble initiators. Examples of suitable initiators are sodium, potassium, and ammonium persulfate or tert-butyl hydroperoxide. tert-Butyl hydroperoxide, which may be activated by catalytic quantities of iron(II) ions, for example, is particularly preferably used. Hydroxide ions and tert-butoxide radicals are hereby formed. The iron(III) ions that are formed may be reduced to iron(II) ions by means of reducing agents. Sodium formaldehyde sulfoxylate, for example, is a suitable reducing agent. In the event of high residual monomer contents, it may be necessary to carry out postpolymerization with re-addition of further quantities of initiator.

In this regard, it has been found that a particular advantage of the method according to the invention is that it may also be carried out in batch operations. In other respects, the procedure described in German Patent application DE 19628142 A1, page 4, lines 6 to 36 may also be employed.

Coating Materials According to the Invention

The primary dispersions according to the invention are used for producing the coating materials according to the invention, or are used directly as such, which is a major advantage of the primary dispersions according to the invention. A further subject matter of the present invention is therefore coating compositions that are composed of or contain the primary emulsions according to the invention.

The coating materials according to the invention are preferably pigmented coating compositions, very particularly preferably cathodically depositable electrodeposition coatings. For these uses, at least one customary, known coating additive may also be added in effective quantities to the primary dispersions according to the invention before, during, and/or after their production. In this regard, before or during production of the primary dispersions according to the invention, only those coating additives are added which do not interfere with or even totally inhibit the miniemulsion polymerization. Those skilled in the art are able to identify such coating additives on the basis of their general expertise. The mentioned coating additives are preferably added after production of the primary dispersions according to the invention.

Examples of suitable coating additives are pigments as described in Römpp Lexikon, Lacke and Druckfarben, Georg Thieme Verlag, 1998, under Effect pigments, page 176; key word "Metal oxide-mica pigments" to "Metal pigments," pages 380 and 381; "Iron blue pigments" to "Iron oxide black," pages 180 and 181; "Pigments" to "Pigment volume concentration," pages 451 to 453; "Thioindigo pigments," page 563; and "Titanium dioxide pigments," page 567. These additives are used when the coating materials according to the invention are utilized as electrodeposition coatings, fillers, nonmetallic topcoats, or water-based paints, but in particular as electrodeposition coatings, preferably within the scope of the so-called wet-on-wet process (see, for example, European Patent EP 0 089 497 B1) for producing multilayer coatings. By their nature, they are omitted when the coating materials according to the invention are used as clearcoats, for example within the scope of the wet-on-wet process.

Further examples of suitable additives are organic and inorganic fillers, thermally curable reactive diluents, low-boiling and/or high-boiling organic solvents, UV absorbers, light stabilizers, free radical scavengers, thermolabile radical initiators, crosslinking catalysts, deaerating agents, slip additives, polymerization inhibitors, defoamers, emulsifiers, wetting agents, adhesion promoters, leveling agents, film-forming auxiliary agents, rheology-controlling additives, or flame retardants. Further examples of suitable coating additives are described in Lehrbuch Lackadditive [Textbook of Coating Additives] by Johan Bieleman, Wiley-VCH, Weinheim, N.Y., 1998.

If the coating materials according to the invention are also to be curable with actinic radiation (dual cure), they preferably contain additives that are curable with actinic radiation. The actinic radiation may be electromagnetic radiation such as near infrared (NIR), visible light, UV light, or X-ray radiation, or may be corpuscular radiation such as electron radiation. Examples of suitable additives that are curable with actinic radiation are known from German Patent DE 197 09 467 C1.

The application of the coating materials according to the invention has no special methodological features, and may take place using any customary application method, such as spraying, knife coating, spreading, pouring, dipping, dripping, or rolling, or by electrodeposition coating, in particular cathodic electrodeposition coating.

All surfaces to be coated which are not damaged by curing of the coatings present on the surfaces, using heat and optionally actinic radiation, are suitable as substrates; these include in particular metals, plastics, wood, ceramic, stone, textiles, fiber composites, leather, glass, glass fibers, glass wool and rock wool, mineral- and resin-bonded construction materials such as gypsum board and cement slabs or roof tiles, and combinations of these materials. Accordingly, the coating material according to the invention is also suitable for applications outside automotive painting. It is suited in particular for coating of furniture and industrial coating, including strip coating, container coating, and impregnation or coating of electrotechnical components. Within the scope of industrial coatings, it is suited for coating practically all parts for residential or industrial use, such as radiators, household appliances, small metal parts such as screws and nuts, hubcaps, wheel rims, packaging containers, or electrotechnical components such as motor windings or transformer windings.

In the case of electrically conductive substrates, the primary dispersions according to the invention or the coating compositions according to the invention that are obtainable therefrom may preferably be applied by means of electrodeposition coating, particularly preferably cathodic electrodeposition coating.

A further subject matter of the present invention is therefore an electrodeposition coating composition (also referred to as electrodeposition coating for short) which includes the primary dispersions according to the invention. Such an electrodeposition coating composition is suited in particular for cathodic dip coating (CDC). Thus, a further subject matter of the present invention is the use of the primary dispersions according to the invention for producing electrodeposition coating compositions, in particular cathodically depositable electrodeposition coating compositions.

The electrodeposition coatings according to the invention preferably have a solids content of 5 to 50 mass-%, preferably 5 to 35 mass-%. In this regard, solids are understood to mean the portion of an electrodeposition coating that remains after drying at 180° C. for 30 min.

As binder, the electrodeposition coatings according to the invention contain at least the dispersed polymer particles contained in the primary dispersions according to the invention and the emulsifiers (E) used according to the invention for producing the primary dispersions, in free form and/or polymerized into the polymer particles. The term "binder" herein is understood to mean the nonvolatile portion of a primary dispersion or of a coating agent, for example an electrodeposition coating, minus the optionally contained fillers and pigments, according to EN ISO 4618:2006.

The dispersed polymer particles contained in the primary dispersions according to the invention preferably contain functional groups which are already reactive, and which are able to undergo thermal crosslinking reactions with complementary reactive functional groups that are present in the above-mentioned crosslinking agents. Examples, mentioned above, of suitable reactive functional groups are hydroxyl groups, thiol groups, and primary and secondary amino groups, in particular hydroxyl groups.

The polymer particles contained in the primary dispersions according to the invention particularly preferably contain at least one type of cationic and/or potentially cationic group, which may be co-polymerized, for example by using monomers a2) or emulsifiers (E) having carbon-carbon multiple bonds. Potentially cationic groups are, for example, initially uncharged primary, secondary, or tertiary amino groups which may converted to ammonium groups by protonation with inorganic or preferably organic acids. Since cathodic electrodeposition coatings usually have a pH of 4.5 to 6.5, which is typically set by adding acids, the pH of the electrodeposition coatings is generally sufficient for converting potentially cationic groups to cationic groups. Examples of suitable acids for the potentially cationic groups are inorganic and organic acids such as sulfuric acid, phosphoric acid, formic acid, acetic acid, lactic acid, propionic acid, alpha-methylolpropionic acid, dimethylolpropionic acid, gamma-hydroxypropionic acid, glycolic acid, tartaric acid, malic acid, citric acid, sugar acids, salicylic acid, 2,4-dihydroxybenzoic acid, or sulfonic acids, such as amidosulfonic acids and alkanesulfonic acids, for example methanesulfonic acid, in particular formic acid, acetic acid, or lactic acid. The use of hydrochloric acid is not preferred, and in one preferred embodiment is precluded.

Further examples of potentially cationic groups that can be converted to cations using neutralizing agents and/or quaternizing agents are secondary sulfide groups or tertiary phosphine groups. Quaternized amino groups, such as those occurring in particular in the emulsifiers (E), are particularly preferred.

Examples of suitable cationic groups are quaternary ammonium groups, tertiary sulfonium groups, or quaternary phosphonium groups, preferably quaternary ammonium groups or tertiary sulfonium groups, but in particular quaternary ammonium groups.

In addition to the dispersed polymer particles of the primary dispersions according to the invention whose use is mandatory, further binders which are typical for electrodeposition coatings may be contained in the electrodeposition coating according to the invention. Further binders for electrodeposition coatings are known from the publications EP 0 082 291 A1, EP 0 234 395 A1, EP 0 227 975 A1, EP 0 178 531 A1, EP 0 333 327, EP 0 310 971 A1, EP 0 456 270 A1, U.S. Pat. No. 3,922,253 A, EP 0 261 385 A1, EP 0 245 786 A1, EP 0 414 199 A1, EP 0 476 514 A1, EP 0 817 684 A1, EP 0 639 660 A1, EP 0 595 186 A1, DE 41 26 476 A1, WO 98/33835, DE 33 00 570 A1, DE 37 38 220 A1, DE 35 18 732 A1, or DE 196 18 379 A1. These are preferably resins containing primary, secondary, tertiary, or quaternary amino or ammonium groups and/or tertiary sulfonium groups, with amine numbers preferably between 20 and 250 mg KOH/g and a weight average molecular weight of 300 to 10,000 Dalton. Amino(meth)acrylate resins, aminoepoxy resins, aminopolyurethane resins, polybutadiene resins containing amino groups, or modified epoxy resin-carbon dioxide-amine reaction products are used in particular. The resins known from WO-A-2004/007443 and also used in the experimental section of the present invention are very particularly preferred epoxy amine resins.

All customary, known crosslinking agents that contain suitable complementary reactive functional groups are acceptable crosslinking agents. The crosslinking agents are preferably selected from the group of crosslinking agents described above.

The electrodeposition coatings according to the invention preferably contain metal compounds in which the metal is present in the form of a cation, very particularly preferably bismuth compounds. Such metal compounds and in particular bismuth compounds are very particularly preferably contained when the emulsifiers (E) contained according to the invention bear a hydroxyl group, thiol group, or primary or secondary amino group in the beta-position with respect to the nitrogen atom in the general formula of the emulsifiers (E). The above-mentioned groups that are present in the beta-position facilitate the crosslinking density of the coating.

Furthermore, the electrodeposition coatings according to the invention may also contain in effective quantities at least one customary, known additive selected from the group of additives described in general above.

Pigments are preferably used. The pigments are preferably selected from the group comprising customary, known coloring, effect-imparting, electrically conductive, magnetically shielding, fluorescent, filling, and corrosion-inhibiting organic and inorganic pigments.

The electrodeposition coatings according to the invention are produced by mixing the above-mentioned components. The components may be homogenized. The electrodeposition coatings according to the invention may optionally be produced with the aid of customary, known mixing processes and devices, such as stirred tank reactors, agitator mills, extruders, kneaders, Ultra-Turrax apparatuses, inline dissolvers, static mixers, micromixers, toothed ring dispersion machines, pressure relief nozzles, and/or microfluidizers.

The electrodeposition coatings according to the invention are used in particular for cathodic dip coating. The electrodeposition coatings according to the invention may typically be cathodically deposited on plastic substrates or in particular metallic substrates that are electrically conductive, for example electrically conductive or made electrically conductive by metallization, for example. The invention therefore further relates to the method for cathodic deposition of the electrodeposition coatings according to the invention on substrates of this type. In addition, the electrodeposition coatings according to the invention may be used for producing primer coats by cathodic dip coating of substrates having electrically conductive surfaces.

Parts made of any common metal, for example the metal parts that are customary in the automotive industry, in particular automotive bodies and their parts, may be used as metallic substrates. Accordingly, the electrodeposition coatings according to the invention may also be used in the painting of motor vehicles or their parts.

The curing of the applied coating materials or electrodeposition coatings according to the invention also has no special methodological features, and takes place according to the customary, known thermal processes such as heating in a convection oven or irradiation with IR lamps, which in the case of dual cure may also be supplemented by irradiation with actinic radiation. Radiation sources such as high-pressure or low-pressure mercury vapor lamps, optionally doped with lead in order to open a radiation window up to 405 nm, or electron beam sources may be used.

The electrically conductive substrates coated with a cathodic electrodeposition coating layer, which are likewise the subject matter of the present invention, may be coated with one or more additional coating layers, for example one or more filler coating layers, one or more base coating layers, and/or one or more clearcoat layers. Coated structures of this type are known in particular from the field of automotive painting. In other areas, however, the application of just an electrodeposition coating layer according to the invention may be sufficient.

The invention is explained in greater detail below by use of examples.

EXEMPLARY EMBODIMENTS

Production of Emulsifier E1 According to the Invention 1417.2 parts Cardolite NC 513 (EEW 532 g/eq) were heated to 70° C., with stirring, in a reaction vessel equipped with a stirrer, reflux cooler, temperature probe, nitrogen inlet, and dropping funnel. 282.9 parts diethanolamine were then added dropwise over a period of 15 min. Stirring was continued until all NH equivalents had reacted and an epoxy amine value (a parameter which reflects the combined material quantities of epoxy groups and amino groups) of 1.57 mmol/g was achieved. As soon as the mixture had cooled to 30° C., 300 parts 80% lactic acid were slowly added dropwise and the mixture was stirred for 30 at room temperature.

Production of Emulsifier E2 According to the Invention
Production of an Addition Product of Diethylene Triamine and ε-Caprolactone:

456.0 parts ε-caprolactone together with 206.0 parts diethylene triamine were placed in a reaction vessel equipped with a stirrer, reflux cooler, temperature probe, and nitrogen inlet and heated to 80° C., with stirring. After 4 hours, an additional 50.0 parts ε-caprolactone were added and stirring was continued for 2 hours before the temperature was increased to 110° C. Stirring was then continued until all primary amine groups had reacted and an MEQ base value of 2.80 mmol/g was achieved, but at least for an additional 3 hours.

Production of Emulsifier E2:
532.0 parts Cardolite NC 513 (EEW 532 g/eq) together with 357.1 parts of the addition product of diethylene triamine and ε-caprolactone produced above were heated to 80° C., with stirring, in a reaction vessel equipped with a stirrer, reflux cooler, temperature probe, and nitrogen inlet, until all NH equivalents had reacted and an epoxy amine value of 1.12 mmol/g was achieved, but at least for two hours. 93.4 parts 90% lactic acid were then added, and stirring was performed for 30 minutes at 80° C.

Production of a Mini-Emulsion M1 Hybrid Stabilized by an Epoxy Amine Adduct and In Situ Polymerization Thereof:

Production of an Epoxy Amine Monoadduct EA1:
265.0 parts Epikote 1001 (EEW 475 g/eq) together with 159.7 parts styrene were heated to 60° C., with stirring, in a reaction vessel equipped with a stirrer, reflux cooler, temperature probe, and nitrogen inlet. 29.7 parts diethanolamine were then added dropwise such that the temperature did not exceed 70° C. Stirring was continued until all NH equivalents had reacted and an epoxy amine value of 1.12 mmol/g was achieved.

Production of the Monomer Mixture:
28.9 parts isobornyl methacrylate, 155.1 parts methyl methacrylate, 133.7 parts butyl acrylate, 18.5 parts hydroxyethyl methacrylate, 140.8 parts Araldite GY 2600 (EEW 186 g/eq), 256.5 parts of a crosslinker based on a diphenylmethane diisocyanate oligomer that had been capped with propylene glycol and butyl diglycol, and present in a 90% 1/1 (w/w) mixture composed of butoxypropanol and phenoxypropanol (CathoGuard® 500 crosslinker, commercial product of BASF Coatings GmbH), 3.0 parts tert-dodecyl mercaptan, and 217.7 parts of the emulsifier E1 were added to EA1 and stirred until a solution was present. 27.5 parts of 80% lactic acid were then added, and stirring was continued for 10 minutes at room temperature. 2346.8 parts deionized water were then added, with vigorous stirring. The coarse emulsion which formed was subsequently stirred at least for an additional 5 minutes.

Production of the Mini-Emulsion:
The coarse emulsion was transferred to an apparatus for introducing high shear forces, and was subsequently homogenized in two passes at 600 bar with a high-pressure homogenizer (Model 110Y from Microfluidics, equipped with one H230Z and one H210Z homogenization chamber).

In Situ Polymerization of the Mini-Emulsion for Producing a Primary Dispersion According to the Invention:

The mini-emulsion was subsequently heated to 75° C., with stirring, in a reaction vessel equipped with a stirrer, reflux cooler, temperature probe, nitrogen inlet, and dosing unit. At a temperature of 75° C., 0.7 parts of a 1% iron(II) sulfate solution were added, and a solution of 3.75 parts sodium formaldehyde sulfoxylate dihydrate in 110.9 parts deionized water was uniformly added dropwise, concurrently with a solution of 5.2 parts of a 70% tert-butyl hydroperoxide solution in 97.1 parts deionized water, over a period of one and one-half hours. Stirring was continued for an additional hour at 75° C. before the mini-emulsion polymerized in situ was cooled to room temperature and filtered (Nylon filter bag with an 80 μm cutoff).

Particle size (Z-average): 104 nm
Particle distribution index (PDI): 0.15
Solids (after drying for 30 minutes at 180° C.): 32.7% by weight In all examples, the particle size distribution was determined by dynamic light scattering, using a Zetasizer Nano S from Malvern. The PDI value was also derived from this measurement.

Production of a Mini-Emulsion M2 Hybrid Stabilized by an Amino-Functionalized Ethylenically Unsaturated Monomer, and In Situ Polymerization Thereof:

Production of the Monomer Mixture:

25.3 parts isobornyl methacrylate, 135.7 parts methyl methacrylate, 117.0 parts butyl acrylate, 16.2 parts hydroxyethyl methacrylate, 139.7 parts styrene, 353.7 parts Araldite GY 2600 (EEW 186 g/eq), 55.1 parts Super ISO Stable (toluene diisocyanate-trimethylolpropane adduct, blocked with 3 equivalents of phenol, commercial product of Super Urecoat Industries), 2.6 parts tert-dodecyl mercaptan, and 126.0 parts of the emulsifier E1 were stirred in a vessel until a solution was present. A solution consisting of 80.3 parts diethylaminoethyl methacrylate, 19.9 parts formic acid, and 1738.4 parts deionized water was subsequently added slowly, with vigorous stirring. The coarse emulsion which formed was subsequently stirred at least for an additional 5 minutes.

Production of the Mini-Emulsion:

The coarse emulsion was transferred to an apparatus for introducing high shear forces, and was subsequently homogenized in two passes at 600 bar with a high-pressure homogenizer (Model 110Y from Microfluidics, equipped with one H230Z and one H210Z homogenization chamber).

In Situ Polymerization of the Mini-Emulsion for Producing a Primary Dispersion According to the Invention:

The mini-emulsion was subsequently heated to 75° C., with stirring, in a reaction vessel equipped with a stirrer, reflux cooler, temperature probe, nitrogen inlet, and dosing unit. At a temperature of 75° C., 0.6 parts of a 1% iron(II) sulfate solution were added, and a solution of 3.3 parts sodium formaldehyde sulfoxylate dihydrate in 97.0 parts deionized water was uniformly added dropwise, concurrently with a solution of 4.6 parts of a 70% tert-butyl hydroperoxide solution in 84.9 parts deionized water, over a period of one and one-half hours. Stirring was continued for an additional hour at 75° C. before the mini-emulsion polymerized in situ was cooled to room temperature and filtered (Nylon filter bag with an 80 μm cutoff).

Particle size (Z-average): 274 nm

PDI: 0.24

Solids (after drying for 30 minutes at 180° C.): 31.1%

Production of a Mini-Emulsion M3 Stabilized with the Emulsifier E2, and In Situ Polymerization Thereof:

Production of the Monomer Mixture:

22.9 parts isobornyl methacrylate, 123.0 parts methyl methacrylate, 106.0 parts butyl acrylate, 14.7 parts hydroxyethyl methacrylate, 126.7 parts styrene, 320.8 parts Araldite GY 2600 (EEW 186 g/eq), 50.0 parts Super ISO Stable (toluene diisocyanate-trimethylolpropane adduct, blocked with 3 equivalents of phenol, commercial product of Super Urecoat Industries), 2.4 parts tert-dodecyl mercaptan, and 159.5 parts of the emulsifier E2 were stirred in a vessel until a solution was present. 1576.8 parts deionized water were subsequently added slowly, with vigorous stirring. The coarse emulsion which formed was subsequently stirred at least for an additional 5 minutes.

Production of the Mini-Emulsion:

The coarse emulsion was transferred to an apparatus for introducing high shear forces, and was subsequently homogenized in two passes at 600 bar with a high-pressure homogenizer (Model 110Y from Microfluidics, equipped with one H230Z and one H210Z homogenization chamber).

In Situ Polymerization of the Mini-Emulsion:

The mini-emulsion was subsequently heated to 75° C., with stirring, in a reaction vessel equipped with a stirrer, reflux cooler, temperature probe, nitrogen inlet, and dosing unit. At a temperature of 75° C., 0.6 parts of a 1% iron(II) sulfate solution were added, and a solution of 3.0 parts sodium formaldehyde sulfoxylate dihydrate in 88.0 parts deionized water was uniformly added dropwise, concurrently with a solution of 4.1 parts of a 70% tert-butyl hydroperoxide solution in 77.0 parts deionized water, over a period of one and one-half hours. Stirring was continued for an additional hour at 75° C. before the mini-emulsion polymerized in situ was cooled to room temperature and filtered (Nylon filter bag with an 80 μm cutoff).

Particle size (Z-average): 82 nm

PDI: 0.07

Solids (after drying for 30 minutes at 180° C.): 31.5%

Production of a Mini-Emulsion not According to the Invention According to Example 12-1 from WO 82/00148, and In Situ Polymerization Thereof:

Production of the Monomer Mixture:

132.0 parts methyl methacrylate, 88.0 parts butyl acrylate, 27.0 parts hydroxyethyl methacrylate, 160.0 parts of a bisphenol A diglycidyl ether (Epikote 828 (EEW 186 g/eq)), 88.0 parts of a crosslinker based on a diphenylmethane diisocyanate oligomer that had been capped with propylene glycol and butyl diglycol, and present in a 90% 1/1 (w/w) mixture composed of butoxypropanol and phenoxypropanol (CathoGuard® 500 crosslinker, commercial product of BASF Coatings GmbH), 20.0 parts Ethoduomeen T/13 (reaction product of 3 mol ethylene oxide and N-alkyl-1,3-diaminopropane based on a tallow fatty alkyl moiety, commercial product of Firma AkzoNobel N.V.) were stirred in a vessel until a solution was present. A solution consisting of 1200.0 parts deionized water and 64.0 parts Duomac T (N-alkyl-1,3-diaminopropane diacetate based on a tallow fatty alkyl moiety, commercial product of Firma AkzoNobel N.V.) was subsequently added slowly, with vigorous stirring. The coarse emulsion which formed was subsequently stirred at least for an additional 5 minutes.

Production of the Mini-Emulsion:

The coarse emulsion was transferred to an apparatus for introducing high shear forces, and was subsequently homogenized in two passes at 600 bar with a high-pressure homogenizer (Model 110Y from Microfluidics, equipped with one H230Z and one H210Z homogenization chamber).

In Situ Polymerization of the Mini-Emulsion:

The mini-emulsion was subsequently heated to 75° C., with stirring, in a reaction vessel equipped with a stirrer, reflux cooler, temperature probe, nitrogen inlet, and dosing unit. At a temperature of 75° C., 0.6 parts of a 1% iron(II) sulfate solution were added, and a solution of 3.0 parts sodium formaldehyde sulfoxylate dihydrate in 88.0 parts deionized water was uniformly added dropwise, concurrently with a solution of 4.1 parts of a 70% tert-butyl hydroperoxide solution in 77.0 parts deionized water, over a period of one and one-half hours. Stirring was continued for an additional hour at 75° C. before the mini-emulsion polymerized in situ was cooled to room temperature and filtered (Nylon filter bag with an 80 μm cutoff).

Particle size (Z-average): 111 nm

PDI: 0.12

Solids (after drying for 30 minutes at 180° C.): 28.8%

Property Testing of the Mini-Suspensions:

Production of a Coating Agent Bath from the Mini-Emulsion M1:

Production of an aqueous preparation for testing the dispersion stability: 1898.7 parts of the mini-emulsion M1 were mixed with 1909.3 parts deionized water. 192.0 parts of an aqueous pigment preparation (CathoGuard® 520 pigment paste, commercial product of BASF Coatings GmbH) were then added, with stirring. The finished bath was stirred for at least 24 additional hours before being tested.

Pump Test:

The pumpability of the bath produced above was tested at 32° C. by pumping in a circuit for 24 hours, using a Little Giant MD 4 magnetic drive centrifugal pump. The sieve residue (25 μm mesh size) was subsequently determined after burning in at 180° C. for 30 minutes. The pumpability was assumed to be adequate with a sieve residue <200 mg/L.

A sieve residue of 16 mg/L was determined after the test was completed.

Ultrafiltration Test:

The ultrafiltration of the bath produced above was carried out via a plate module with PVDF membranes having a total surface area of 880 cm² (150 kDa cutoff, commercial product from Microdyn-Nadir GmbH). For assessing the ultrafiltration capability, the flux performance as well as the inlet pressure and outlet pressure were determined over a period of at least one week. The ultrafiltration capability was assumed to be adequate when the flux performance, at a minimum performance of 10 L/hm², decreased by less than 20% over the entire test period, with no continuous decrease. The following characteristic data for the above bath were determined during the test:

TABLE

Ultrafiltration characteristic data

| Duration [h] | Flux performance [L/hm²] | Change compared to start [%] | Inlet pressure [bar] | Outlet pressure [bar] | Temperature [° C.] |
|---|---|---|---|---|---|
| 0 | 23.50 | 0.0 | 2 | 0.7 | 22 |
| 17.25 | 23.90 | 1.7 | 1.9 | 0.7 | 29 |
| 23.25 | 23.70 | 0.9 | 1.9 | 0.7 | 28.8 |
| 89.45 | 23.80 | 1.3 | 1.9 | 0.7 | 26.9 |
| 114.7 | 24.10 | 2.6 | 1.9 | 0.7 | 28.6 |
| 120.2 | 23.80 | 1.3 | 1.9 | 0.7 | 29.1 |
| 138.7 | 23.80 | 1.3 | 1.9 | 0.7 | 27.8 |
| 161.2 | 23.60 | 0.4 | 1.9 | 0.7 | 27.6 |

The flux performance was essentially constant over the test period.

Production of a Coating Agent Bath from the Mini-Emulsion M2:

Production of an aqueous preparation for testing the dispersion stability: 1929.3 parts of the mini-emulsion M2 were mixed with 1878.7 parts deionized water. 192.0 parts of an aqueous pigment preparation (CathoGuard® 520 pigment paste, commercial product of BASF Coatings GmbH) were then added, with stirring. The finished bath was stirred for at least 24 additional hours before being tested.

Pump Test:

The pump test was carried out as described above.

A sieve residue of 38 mg/L was determined after the test was completed.

Ultrafiltration Test:

The ultrafiltration test was carried out as described above. The following characteristic data were determined during the test:

TABLE 2

Ultrafiltration characteristic data

| Duration [h] | Flux performance [L/hm²] | Change compared to start [%] | Inlet pressure [bar] | Outlet pressure [bar] | Temperature [° C.] |
|---|---|---|---|---|---|
| 0 | 14.24 | 0 | 2 | 0.1 | 23.7 |
| 2.5 | 14.89 | 5 | 1.8 | 0.1 | 25.7 |
| 6 | 15.20 | 7 | 1.65 | 0.1 | 26.9 |
| 22 | 13.96 | −2 | 1.6 | 0.1 | 25.3 |
| 26.5 | 14.21 | 0 | 1.6 | 0.1 | 27.1 |
| 30.5 | 14.24 | 0 | 1.55 | 0.1 | 29.1 |
| 48 | 14.39 | 1 | 1.5 | 0.1 | 27 |
| 52 | 14.74 | 4 | 1.5 | 0.1 | 27.1 |
| 71 | 14.80 | 4 | 1.45 | 0.1 | 27.8 |
| 77.5 | 15.53 | 9 | 1.4 | 0.1 | 28 |
| 96.5 | 16.02 | 13 | 1.45 | 0.1 | 28.2 |
| 101.5 | 16.27 | 14 | 1.4 | 0.1 | 28 |
| 170.5 | 17.67 | 24 | 1.4 | 0.1 | 29.1 |

At the end of the test, the flux performance had increased by 24% compared to the start of the test.

Production of a Coating Agent Bath from Comparative Example 12-1:

Production of an aqueous preparation for testing the dispersion stability: 1991.5 parts of the mini-emulsion from Comparative Example 12-1 from WO 82/00148 were mixed with 1816.5 parts deionized water. 192.0 parts of an aqueous pigment preparation (CathoGuard® 520 pigment paste, commercial product of BASF Coatings GmbH) were then added, with stirring. The finished bath was stirred for at least 24 additional hours before being tested.

Pump Test:

For this bath, inadequate pumpability was determined solely on a visual basis, since coagulate had settled in the gap between the pump housing and the blade bodies in a large quantity (much more than >1 g/L)

Ultrafiltration Test:

On account of the failed pump test, no ultrafiltration test was conducted.

The invention claimed is:

1. An aqueous, cationically stabilized primary dispersion comprising dispersed polymer particles which:
   i. have a Z-average particle diameter of 5 to 500 nm, and
   ii. are obtained by an emulsion polymerization of at least one olefinically unsaturated monomer (A), the emulsion polymerization taking place in the presence of one or more emulsifiers (E) having the following formula:

$$R^1\text{---}N(R^2)(R^3),$$

where
- $R^1$ is a moiety with 15 to 40 carbon atoms which contains at least one aromatic group and at least one aliphatic group, and which contains at least one functional group selected from the group consisting of hydroxyl groups, thiol groups, primary amino groups, secondary amino groups, at least one carbon-carbon multiple bond, and mixtures thereof, and
- $R^2$ and $R^3$, independently of one another, are the same or different aliphatic moieties containing 1 to 14 carbon atoms.

2. The aqueous, cationically stabilized primary dispersion according to claim 1, wherein the moiety $R^1$ has the structure $Gr_{ali1}$-$Gr_{arom}$-$Gr_{ali2}$-, where $Gr_{arom}$ stands for an aromatic group, $Gr_{ali1}$ stands for a first aliphatic group, and $Gr_{ali2}$ stands for a second aliphatic group.

3. The aqueous, cationically stabilized primary dispersion according to claim 2, wherein the moiety $R^1$ in the aliphatic group Gram has at least one carbon-carbon multiple bond.

4. The aqueous, cationically stabilized primary dispersion according to claim 2, wherein the moiety $R^1$ in the aliphatic group $Gr_{ali2}$ has at least one functional group selected from the group consisting of hydroxyl groups, thiol groups, primary amino groups, and secondary amino groups.

5. The aqueous, cationically stabilized primary dispersion according to claim 4, wherein the moiety $R^1$ in the aliphatic group $Gr_{ali2}$ has a functional group selected from the group consisting of hydroxyl groups, thiol groups, primary amino groups, and secondary amino groups in the beta-position with respect to the nitrogen atom in the general formula of the emulsifier according to claim 1.

6. The aqueous, cationically stabilized primary dispersion according to claim 2, wherein:
- $Gr_{ali1}$ is linear, unsubstituted, and free of heteroatoms and has one to three carbon-carbon double bonds,
- $Gr_{arom}$ is a phenylene or naphthylene group, and
- $Gr_{ali2}$ is linear, contains a hydroxyl group in the beta-position with respect to the nitrogen atom in the general formula of the emulsifier (E), and additionally contains O in the form of an ether group as a heteroatom.

7. The aqueous, cationically stabilized primary dispersion according to claim 1, wherein at least two of the moieties $R^1$, $R^2$, and $R^3$ bear a functional group selected from the group consisting of hydroxyl groups, thiol groups, primary amino groups, secondary amino groups, and mixtures thereof.

8. The aqueous, cationically stabilized primary dispersion according to claim 7, wherein in addition to containing at least one functional group selected from the group consisting of hydroxyl groups, thiol groups, primary amino groups and secondary amino groups, the moieties $R^2$ and $R^3$ bear at least one additional functional group selected from ether groups, ester groups, and amide groups.

9. The aqueous, cationically stabilized primary dispersion according to claim 1, wherein a mixture of emulsifiers (E) is used in which more than 50 mol-% of the moieties $R^1$ have carbon-carbon multiple bonds.

10. The aqueous, cationically stabilized primary dispersion according to claim 1, wherein the olefinically unsaturated monomer (A) is selected from the group consisting of:
- a1) (meth)acrylic acid esters which are free of acid groups;
- a2) monomers which bear at least one hydroxyl group, or one primary, secondary, tertiary, or quaternary amino group, or one alkoxymethylamino group or one imino group per molecule, which are free of acid groups and which are different from the emulsifiers (E);
- a3) monomers which bear at least one acid group per molecule which may be converted to the corresponding acid anion group;
- a4) vinyl esters of monocarboxylic acids, branched in the alpha-position, containing 5 to 18 carbon atoms in the molecule;
- a5) reaction products of acrylic acid and/or methacrylic acid with the glycidyl ester of a monocarboxylic acid branched in the alpha-position and containing 5 to 18 carbon atoms per molecule;
- a6) cyclic or acyclic olefins;
- a7) (meth)acrylic acid amides;
- a8) monomers containing epoxy groups;
- a9) vinyl aromatic hydrocarbons;
- a10) acrylonitrile or methacrylonitrile;
- a11) vinyl compounds selected from the group of vinyl halides, vinylidene dihalides, N-vinyl amides, vinyl ethers, and vinyl esters that are different from the monomers a4);
- a12) allyl compounds;
- a13) polysiloxane macromonomers having a number average molecular weight $M_n$ of 1000 to 40,000 and an average of 0.5 to 2.5 ethylenically unsaturated double bonds per molecule;
- a14) acryloxysilane-containing vinyl monomers; and
- mixtures thereof.

11. The aqueous, cationically stabilized primary dispersion according to claim 10, wherein the olefinically unsaturated monomer (A) is selected from the group consisting of monomers a1), a2), a9) and the mixtures thereof.

12. The aqueous, cationically stabilized primary dispersion according to claim 10, wherein a mixture of olefinically unsaturated monomers (A) is used which comprises:
- monomers a1) selected from the group of (meth)acrylic acid alkyl esters or (meth)acrylic acid cycloalkyl esters containing up to 20 carbon atoms in the alkyl or cycloalkyl moiety,
- monomers a2) selected from the group comprising monomers which bear at least one hydroxyl group or a primary, secondary, tertiary, or quaternary amino group, and styrene as monomers a9).

13. A method for producing an aqueous cationically stabilized primary dispersion according to claim 1 comprising the steps of:
(1) introducing into an aqueous medium the olefinically unsaturated monomer(s) (A) and the emulsifier(s) (E) and, optionally, at least one crosslinking agent and/or further binders,
(2) then converting the mixture of step (1) into a mini-emulsion using shear forces, and
(3) then carrying out an emulsion polymerization reaction on the mini-emulsion.

14. The method according to claim 13, further comprising addition of one or more crosslinking agents selected from the group consisting of blocked polyisocyanates, tris(alkoxycarbonylamino)triazines, completely etherified aminoplast resins, and mixtures thereof.

15. The method according to claim 13 further comprising an epoxy amine adduct used as a further binder.

16. The method according to claim 13, wherein the polymerization is carried out using at least one of a temperature of 25 to 95° C., a pressure of 1.5 to 3000 bar or both.

17. The method according to claim 13, wherein the emulsion polymerization is initiated by at least one water-soluble initiator selected from the group consisting of sodium persulfate, potassium persulfate, ammonium persulfate, tert-butyl hydroperoxide, and mixtures thereof.

18. A coating composition comprising an aqueous, cationically stabilized primary dispersion according to claim 1.

19. The coating composition according to claim 18, wherein it is an electrodeposition coating composition.

20. The coating composition according to claim 19, wherein the electrodeposition coating composition is cathodically depositable.

21. An electrically conductive substrate coated with a coating composition according to claim 18.

22. The coated electrically conductive substrate according to claim 21, wherein it is a metallic substrate.

23. The electrically conductive substrate according to claim 21, wherein it is an automotive body or a part thereof.

* * * * *